(No Model.)
H. A. CHURCH.
Ornamental Chain.
No. 241,189. Patented May 10, 1881.
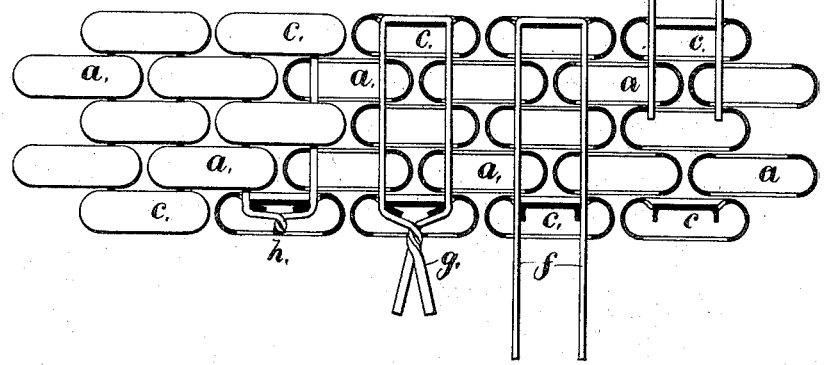
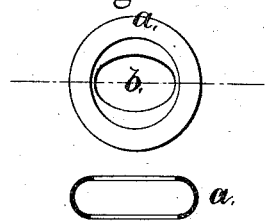
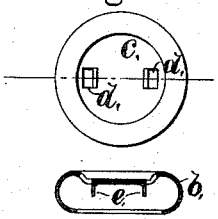
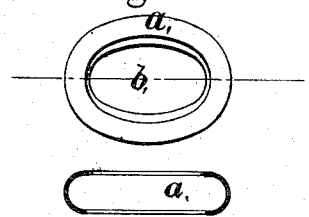
WITNESSES:
J. A. Miller Jr
Wm. L. Cox
INVENTOR:
Henry A Church
by Joseph A Miller
atty

UNITED STATES PATENT OFFICE.

HENRY A. CHURCH, OF PROVIDENCE, RHODE ISLAND.

ORNAMENTAL CHAIN.

SPECIFICATION forming part of Letters Patent No. 241,189, dated May 10, 1881.

Application filed February 5, 1881. (No model.)

*To all whom it may concern:*

Be it known that I, HENRY A. CHURCH, of the city and county of Providence, and State of Rhode Island, have invented a new and useful Improvement in Ornamental Chains; and I hereby declare that the following is a full, clear, and exact description of the same, reference being had to the accompanying drawings, forming part of this specification.

This invention has reference to that class of ornamental chains in which a large number of units are secured together so as to form a band of any desired width and length by securing the desired number of units together by means of wires, staples, or pins passing through the same transversely, such chains being known in the trade as "roller-chains."

The invention consists in providing the central units of such chains with an oval, elliptical, or elongated opening through which the wire uniting the units is passed.

It also consists in the peculiar and novel manner in which the units are secured together, and in the construction of the outer units, all of which will be more fully set forth hereinafter.

In this kind of chain as heretofore constructed, the units or links can be turned on the wires, staples, or other devices by which they are secured together. When in use and when handled, some of the links are liable to be turned around. As these chains have to be polished and finished after the units have been secured, only a portion of each link can be polished, and when in handling the links are turned some will present unpolished surfaces, and thus injure the appearance of the chain.

Figure 1 is a sectional view of my improved chain. Fig. 2 is a view of one of the links or units having an oval opening, and a sectional view of a link or unit. Fig. 3 is a view and section of one of the links or units forming the outer edge of the chain, showing the manner of cutting the holes so as to form a bearing for the wire. Fig. 4 is a view and section of an oval link or unit. Fig. 5 is a view and section of an elongated link or unit.

In the drawings, *a a* represent the links or units out of which the chains are made by securing any number (to form the desired width) together by means of a continuous wire, wire staples or pins, so that the links are interlocked, as is shown in Fig. 1. These links or units are usually made circular, as shown in Figs. 1 and 2; but they may be made oval or elongated, as shown in Figs. 4 and 5. The links have heretofore been provided with round or circular holes, and were liable to turn on the wires by means of which they were secured together. To prevent them from turning I provide them with the oval, elliptical, or elongated opening *b*, through which the wires for fastening the links together pass. These elongated openings *b* secure the desired play and flexibility to the chain, while they prevent the links from turning and presenting the end surfaces to view.

*c c* are the links or units forming the edge of the band or chain. These links are closed on one side, so as to form a bearing for the wire, pin, or staple by which the links forming the chain are united. This closed side is provided with the holes *d d*, through which the wire, pin, or staple passes by which the links are united or secured to form the chain. This closed side of the links has heretofore been on a line with the outer surface of the link, and the wire, staple, or pin securing the links together projected beyond the links. To improve the appearance of the chain and protect the wire I depress the surface, as is shown in Figs. 1 and 3.

The holes *d d* have heretofore been punched into the closed side of the links *c c*, and as the metal of the links is very thin the wires or staples were bent over the thin edge of the metal. To stiffen the sides and present more surface at the edge of the holes *d d*, over which the wires are bent, I allow the whole or a portion of the metal cut out to form the hole *d* to bend inward and form the rips *e e*, and bend the wire over these rips, as is shown in Fig. 1.

In forming the chain, staples are preferable for securing the links together to continuous wires, as the chain can be more readily made and more easily repaired; and instead of merely clinching the ends of the staples I twist the ends of the staples *f f*, as shown at *g*, Fig. 1, and thus draw the links more closely together. I then cut off the surplus of the ends and press the twisted end of the staple *f f* into the links, as shown at *h*. A strong durable chain is thus produced, simple in construction and superior to chains as heretofore constructed.

Having thus described my invention, I claim as new and desire to secure by Letters Patent—

1. An ornamental chain composed of a series of rings or units provided with an oval or elongated opening, through which the wire, pin, or staple is passed to secure the units and prevent them from rotating, as described.

2. In an ornamental chain, units $c\ c$, having the closed side depressed and perforated, to receive the wire, pin, or staple and protect the same, as described.

3. The combination, with the units $c\ c$, provided with the holes $d\ d$, of the rips $e\ e$, formed by bending the metal from the holes $d\ d$ inward, as described.

HENRY A. CHURCH.

Witnesses:
 J. A. MILLER, Jr.,
 WM. L. COOP.